US007699513B2

(12) United States Patent
Nakada et al.

(10) Patent No.: US 7,699,513 B2
(45) Date of Patent: Apr. 20, 2010

(54) LAMP UNIT FOR VEHICLE

(75) Inventors: Yusuke Nakada, Shizuoka (JP); Michio Tsukamoto, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 15 days.

(21) Appl. No.: 12/100,036

(22) Filed: Apr. 9, 2008

(65) Prior Publication Data

US 2008/0253141 A1 Oct. 16, 2008

(30) Foreign Application Priority Data

Apr. 10, 2007 (JP) ............................ 2007-103189

(51) Int. Cl.
*B60Q 1/00* (2006.01)

(52) U.S. Cl. ........................ 362/538; 362/521; 362/548

(58) Field of Classification Search ................. 362/507, 362/543, 544, 545, 548, 539, 516, 517, 518, 362/520, 522

See application file for complete search history.

(56) References Cited

U.S. PATENT DOCUMENTS 3,431,449 A * 3/1969 Hundley ..................... 313/111
5,014,173 A 5/1991 Lindae et al.
6,386,743 B1 * 5/2002 Futami et al. ............... 362/516
6,416,210 B1 7/2002 Uchida et al.
7,244,057 B2 * 7/2007 Watanabe et al. ........... 362/544
7,410,282 B2 * 8/2008 Eichelberger et al. ....... 362/545
7,419,290 B2 * 9/2008 Inaba ......................... 362/538
2005/0200976 A1 9/2005 Bonitz et al.

FOREIGN PATENT DOCUMENTS

DE 40 31 352 A1 4/1992
JP 2004-095481 A 3/2004

OTHER PUBLICATIONS

European Search Report dated Jul. 3, 2008 from Application No. 08154242.5 (7 pages).

* cited by examiner

*Primary Examiner*—John A Ward
(74) *Attorney, Agent, or Firm*—Osha • Liang LLP

(57) ABSTRACT

A lamp unit includes a projection lens disposed on an optical axis, a light source disposed on a rear side of a rear focal point of the projection lens, a reflector configured to forwardly reflect light emitted from the light source toward the optical axis, and a shade configured to shield a part of the light reflected by the reflector. The lamp unit is configured to form a light distribution pattern having a cutoff line. An incidence plane of the projection lens includes a vertical diffusing portion which regulates the cutoff line. The vertical diffusing portion includes a plurality of lens elements extending substantially parallel to a horizontal portion of the upper edge of the shade. A vertical section of each of the lens elements is convex or concave with respect to a reference surface of the incidence plane.

19 Claims, 9 Drawing Sheets

LAMP UNIT FOR VEHICLE

BACKGROUND OF INVENTION

1. Field of the Invention

The present invention relates to a lamp unit for a vehicle, and more particularly, to a projector-type lamp unit configured to form a light distribution pattern having a cutoff line.

2. Background Art

A projector-type lamp unit is one type of lamp unit for a vehicle. Related art projector-type lamp units include a projection lens disposed on an optical axis extending in a front-and-rear direction of the vehicle, a light source disposed on a rear side of a rear focal point of the projection lens, and a reflector which forwardly reflects a light emitted from the light source toward the optical axis.

In order to form a light distribution pattern having a cutoff line, e.g., a lower-beam light distribution pattern, which is also called as a passing-beam light distribution pattern, with a light irradiating from the projector-type lamp unit, a shade is provided near the rear focal point of the projection lens to shield a part of the light reflected by the reflector so that the cutoff line is formed as an inverted projection image of an upper edge of the shade (see, e.g., JP 2004-95481 A).

However, in the related art projector-type lamp units, the cutoff line formed as the inverted projection image of the upper edge of the shade is very clear, and the light is rarely irradiated toward an upper side of the cutoff line. Therefore, there has been a disadvantage in that visibility in a distant region of a road surface in front of the vehicle tends to be insufficient.

SUMMARY OF INVENTION

One or more exemplary embodiments of the present invention provide a projector-type lamp unit configured to form a light distribution pattern having a vague cutoff line to improve visibility of a driver.

According to one or more exemplary embodiments of the present invention, a lamp unit for a vehicle is provided. The lamp unit includes a projection lens disposed on an optical axis extending in a front-and-rear direction of the vehicle, a light source disposed on a rear side of a rear focal point of the projection lens, a reflector configured to forwardly reflect a light emitted from the light source toward the optical axis, and a shade having an upper edge and configured to shield a part of the light reflected by the reflector. The lamp unit is configured to form a light distribution pattern having a cutoff line. The cutoff line is an inverted projection image of the upper edge of the shade. An incidence plane of the projection lens includes a first vertical diffusing portion which regulates the cutoff line. The vertical diffusing portion includes a plurality of first lens elements extending substantially parallel to a horizontal portion of the upper edge of the shade, a vertical section of each of the first lens elements being convex or concave with respect to a reference surface of the incidence plane.

Other aspects and advantages of the invention will be apparent from the following description, the drawings and the claims.

DETAILED DESCRIPTION

Hereinafter, exemplary embodiments of the present invention will be described with reference to the drawings.

Figure 4:
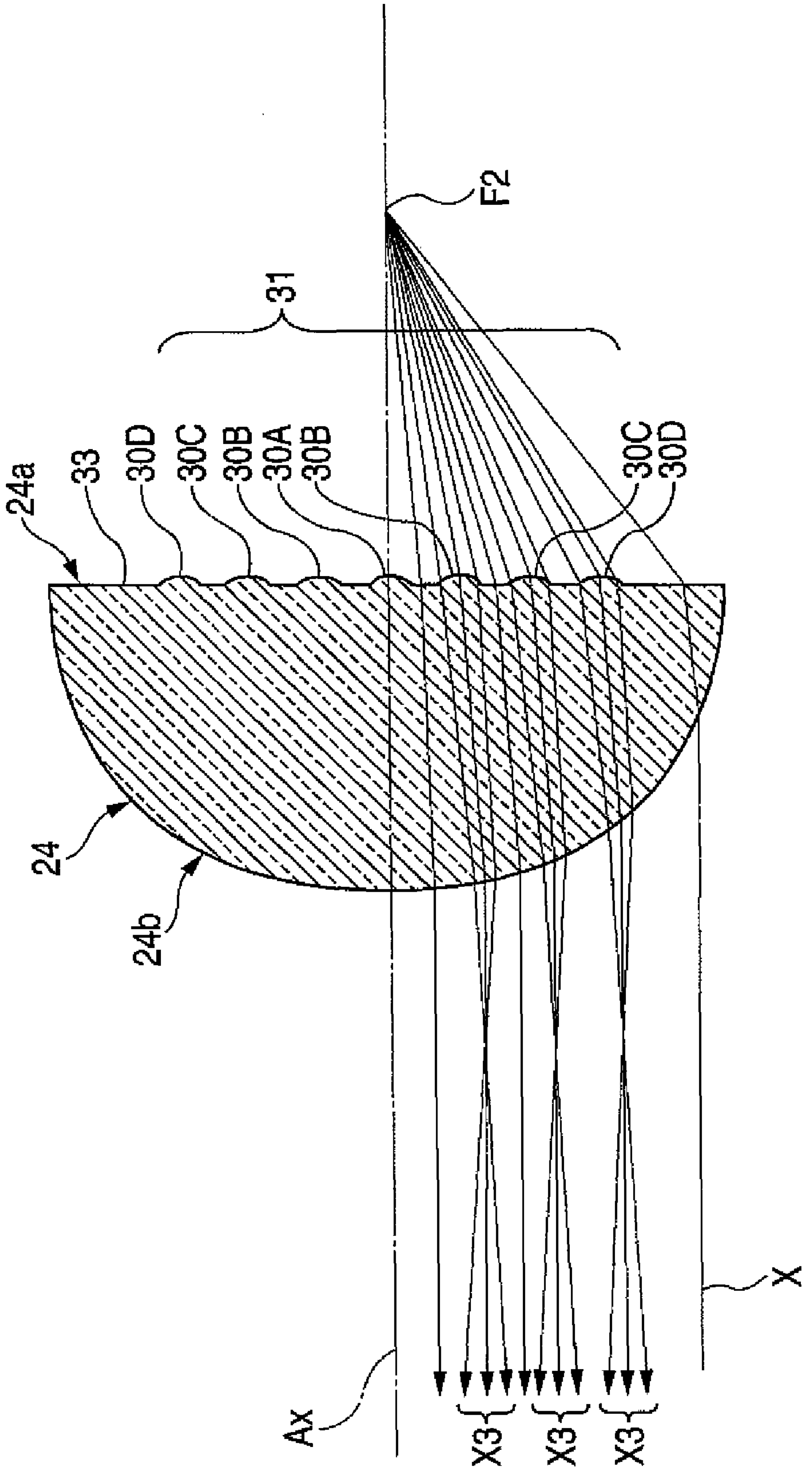
FIG. 4 is a ray tracing view in a vertical section of a projection lens illustrated in FIG. 3.
Figure 5:
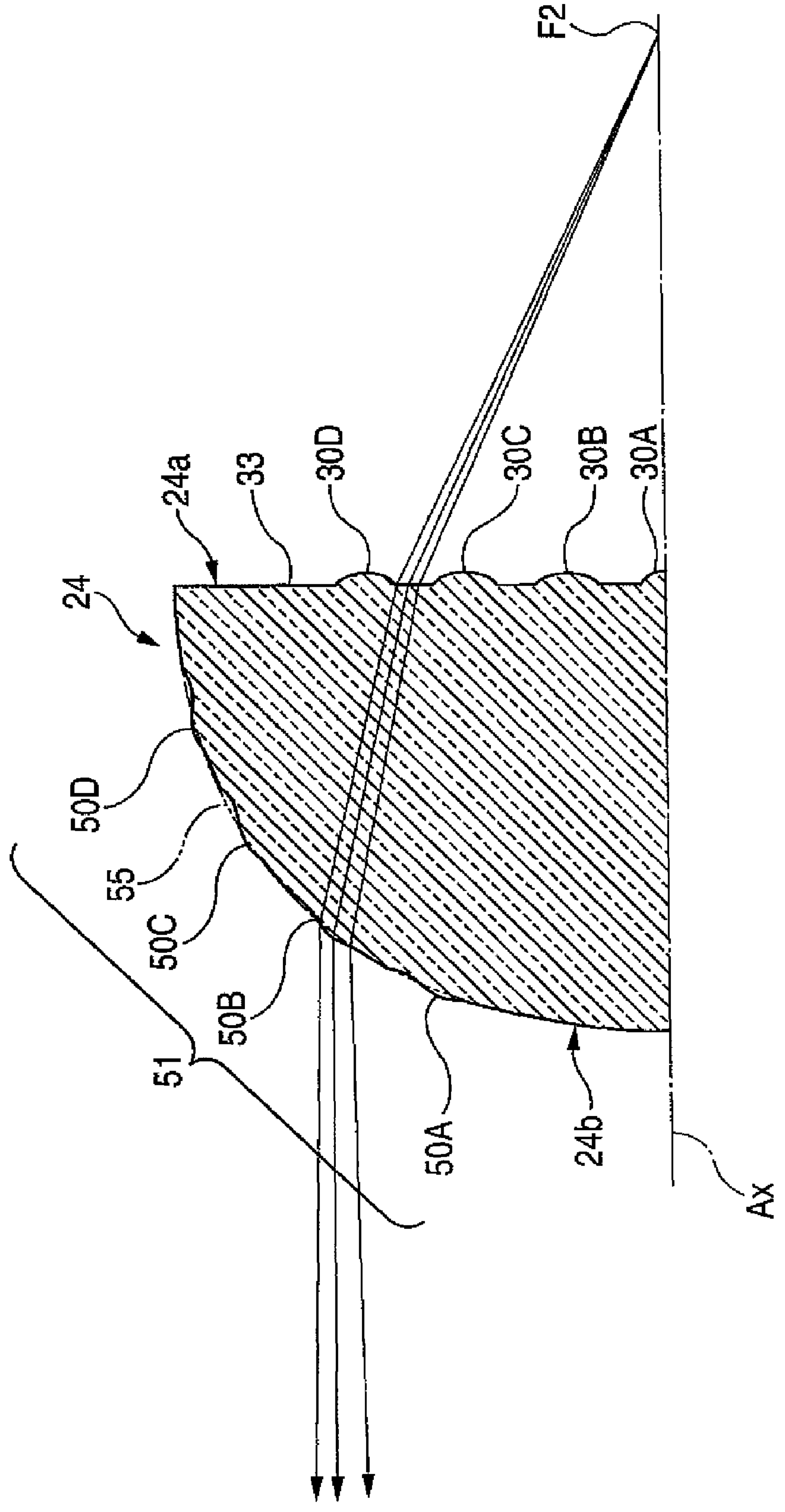
FIG. 5 is an enlarged sectional view showing a part of the projection lens illustrated in FIG. 4.

In FIGS. 4 and 5, portions of optical paths of light incident on a projection lens 24 from a virtual point light source at a rear focal point of the projection lens 24 are illustrated for better understanding of an optical function of the projection lens 24.

Figure 1:
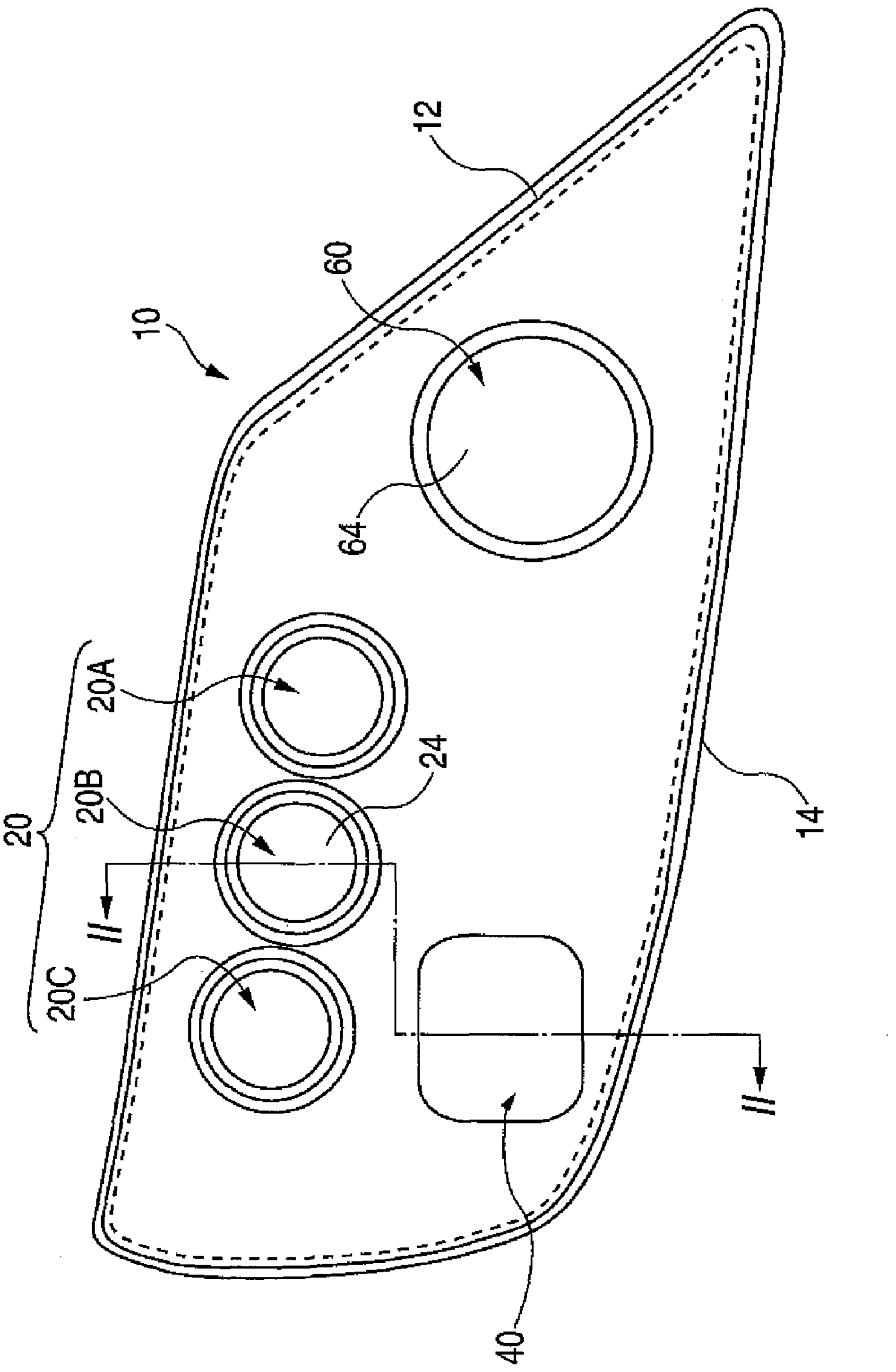
FIG. 1 is a front view of a vehicle lamp having a lamp unit according to an exemplary embodiment of the present invention.

A vehicle lamp 10 according to an exemplary embodiment is a headlamp adapted to be attached to a front end portion of a vehicle, and can be turned on and off while selectively switching between an upper beam and a lower beam. In FIG. 1, a headlamp for a right part of the vehicle is illustrated as the vehicle lamp 10.

Figure 2:
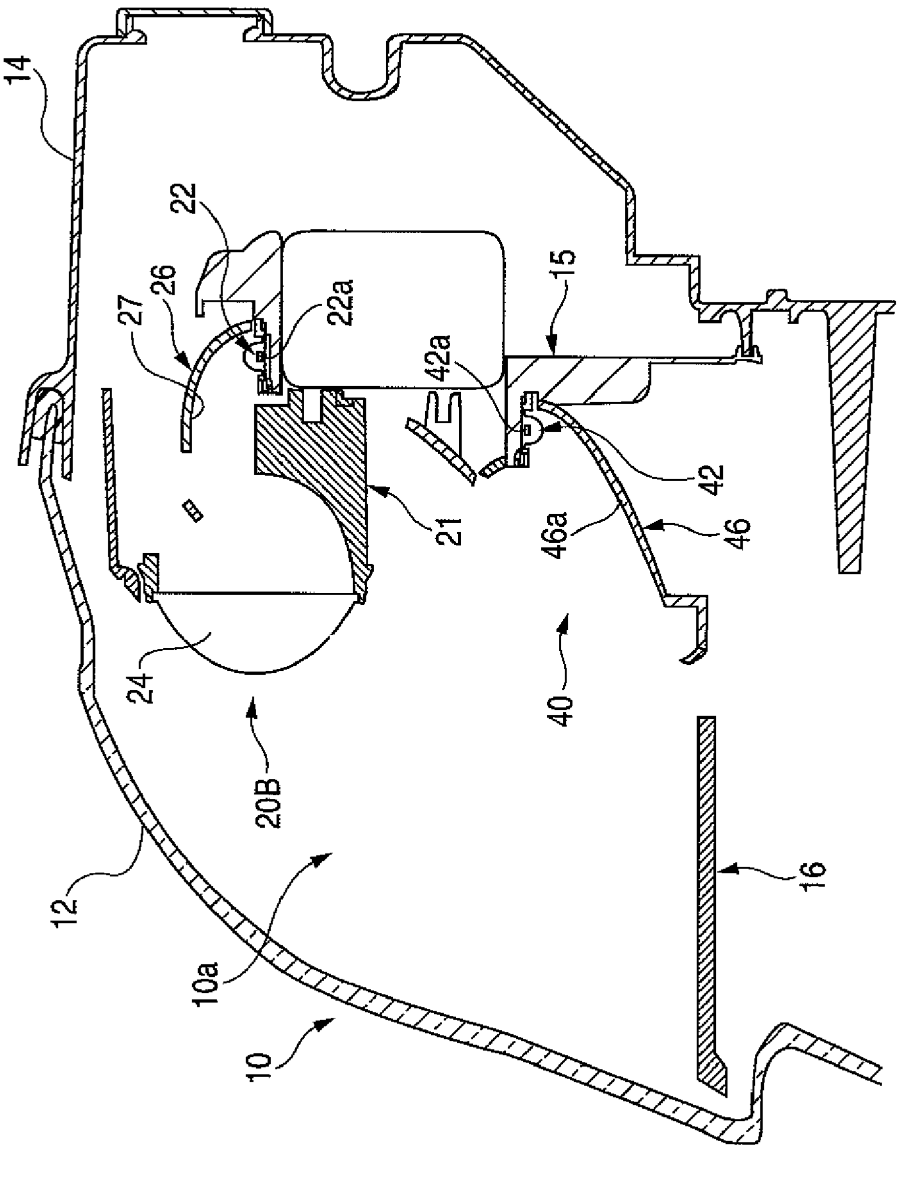
FIG. 2 is a sectional view of the vehicle lamp taken along the line II-II shown in FIG. 1.

As shown in FIGS. 1 and 2, the vehicle lamp 10 includes a transparent cover 12 having an optical transparency and a lamp body 14. Three lamp units, namely, a first unit 20, a second unit 40, and a third unit 60, are disposed and fixed on a support member 15 inside a lamp chamber 10*a* surrounded by the transparent cover 12 and the lamp body 14. The vehicle lamp 10 further includes an extension 16 disposed between the lamp units 20, 40, 60 and the transparent cover 12 to cover a clearance that can be otherwise seen from a front side of the lamp.

The support member 15 includes a first supporting surface 15*a* to which an attaching surface 22*b* of a first semiconductor light emitting device 22, i.e., a first light source of the first unit 20, which may be a light emitting diode for example, is attached, and a second supporting surface 15*b* to which an attaching surface 42*b* of a second semiconductor light emitting device 42, i.e. a second light source of the second unit 40, which may also be a light emitting diode, is attached. The support member 15 is fixed to the lamp body 14 via a leveling mechanism (not shown) so that an optical axis of each of the lamp units 20, 40, 60 can be adjusted.

Next, the respective lamp units 20, 40, 60 will be described.

The vehicle lamp 10 according to one or more embodiments is configured to form a lower-beam light distribution pattern PL by combining lights irradiated from the first unit 20 and the second unit 40, and to form an upper-beam light distribution pattern with a light irradiated from the third unit 60.

The first unit 20 is configured to form the lower-beam light distribution pattern PL together with the second unit 40. As shown in FIG. 1, the first unit 20 includes three subunits 20A, 20B, 20C which are configured in a similar manner and are arranged in a width direction of a vehicle on a mounting portion on an upper part of the support member 15.

Figure 8:
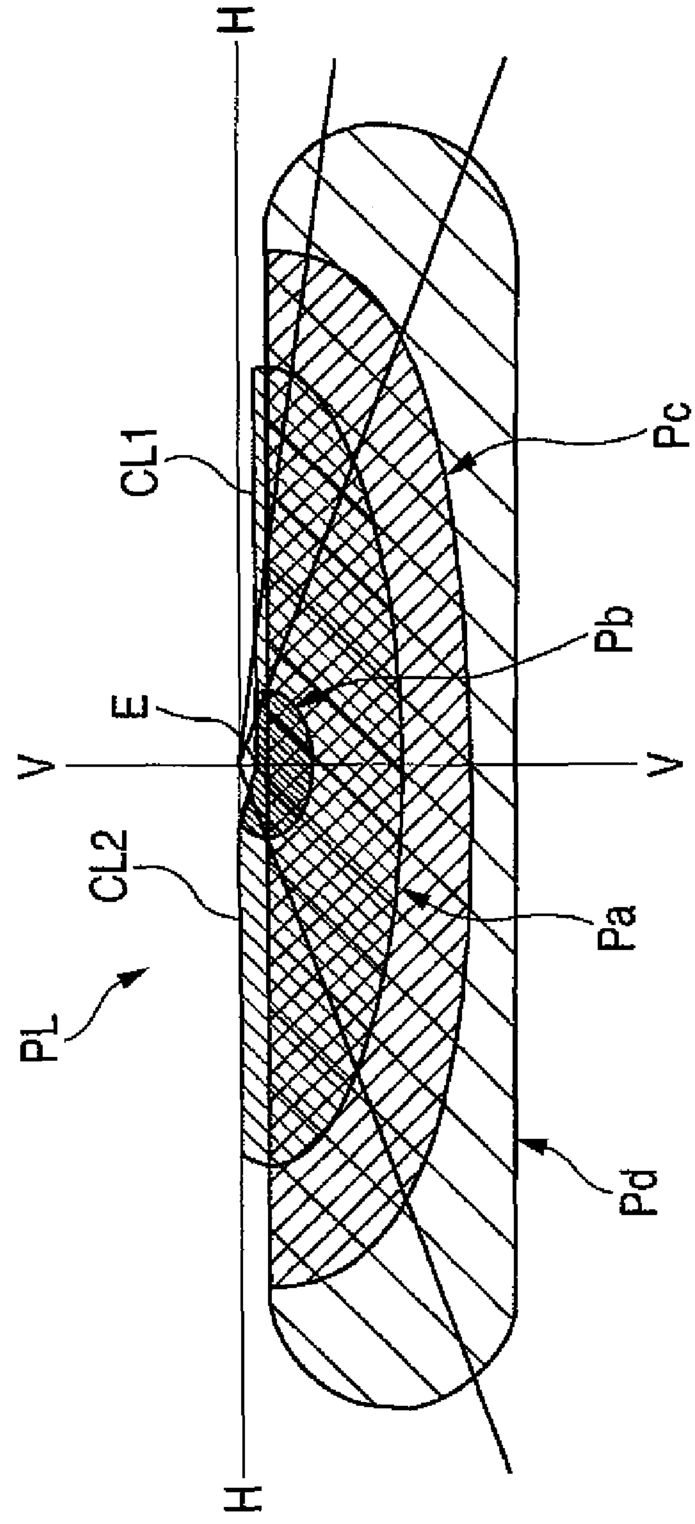
FIG. 8 is a perspective view showing a lower-beam light distribution pattern formed, on a virtual vertical screen disposed 25 m in front of the vehicle lamp, by a light irradiation from the vehicle lamp illustrated in FIG. 1.

The subunit 20A is configured to form a hot zone forming pattern Pb having a part of a horizontal cutoff line CL1 and an oblique part of a cutoff line CL2 at an upper edge thereof (see FIG. 8). The subunit 20B is configured to form a cutoff line forming pattern Pa on a lower side of the cutoff lines (see FIG. 8). The cutoff line forming pattern Pa is larger than the hot zone forming pattern Pb. The subunit 20C is configured to form a diffusing region forming pattern Pc which overlaps with the hot zone forming pattern Pb and the cutoff line forming pattern Pa below the cutoff lines. The diffusing region forming pattern Pc is wider than the cutoff line forming pattern Pa (see FIG. 8).

Figure 3:
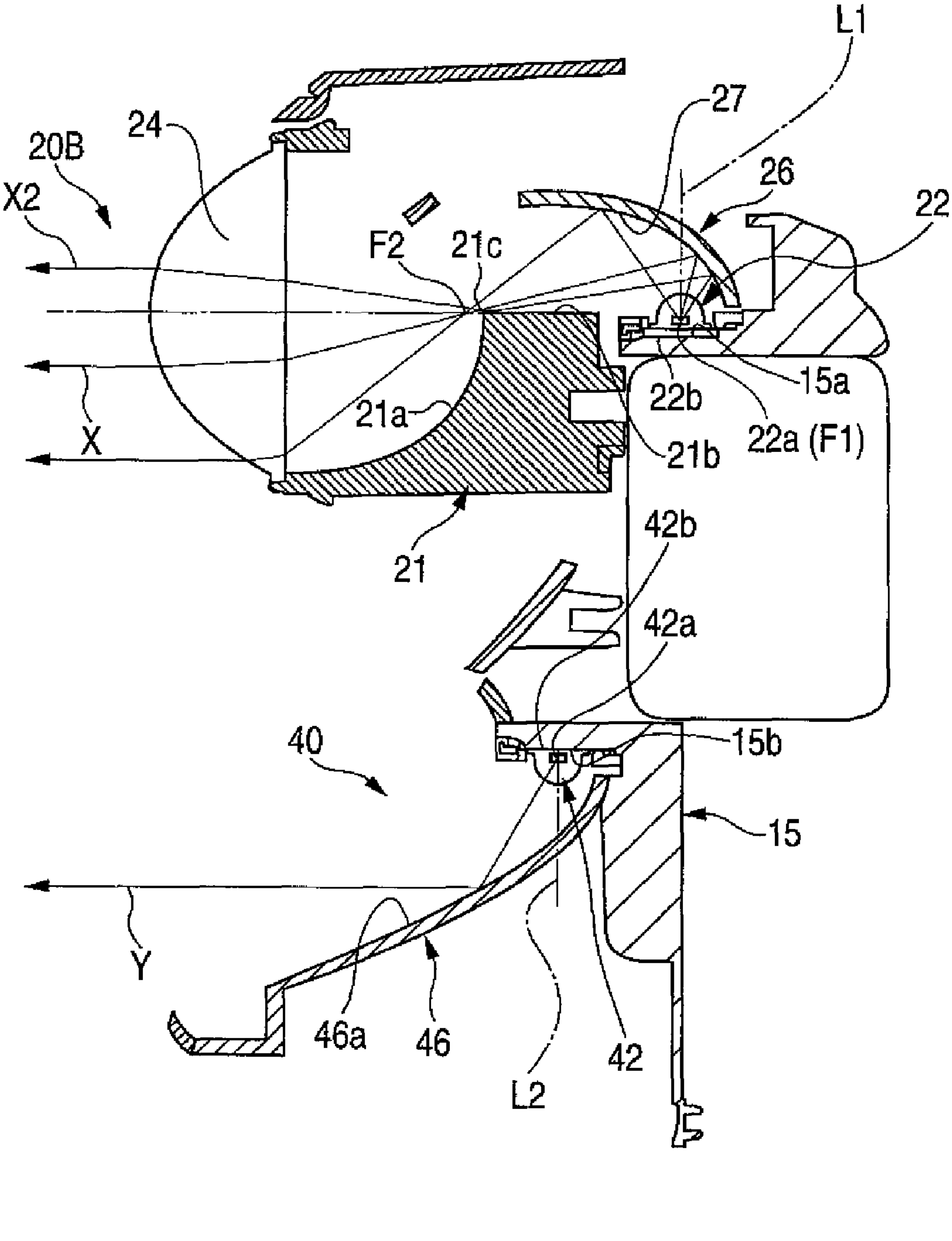
FIG. 3 is an enlarged view a part of the vehicle lamp illustrated in FIG. 2.

As shown in FIGS. 2 and 3, the subunit 20B (the subunits 20A, 20C are substantially the same as subunit 20B) includes a first semiconductor light emitting device 22 as a first light source which is fixed and disposed onto the first supporting surface 15*a* of the support member 15, a first main reflector 26 for forward reflecting a light from the first semiconductor light emitting device 22, a base member 21 disposed in front of the support member 15, and a projection lens 24 held on the base member 21.

The first semiconductor light emitting device 22 is a white light emitting diode having a light emitting portion 22*a* (a light emitting chip), a size of which is about 1 mm square. The first semiconductor light emitting device 22 is mounted on the first supporting surface 15*a* of the support member 15 such that an irradiating axis L1 of the light emitting portion 22*a* is oriented vertically upward so as to be substantially perpendicular to a direction of irradiation of the subunit 20B (a leftward direction in FIG. 3). The light emitting portion 22*a* may be disposed at a slight angle in accordance with the shape of the light emitting portion or a light pattern to be irradiated forward. Moreover, a plurality of light emitting portions (light emitting chips) may be provided in one semiconductor light emitting device.

The first main reflector 26 is a reflecting member having an inside provided with a reflecting surface 27 in which a vertical section takes an almost elliptical shape and a horizontal section takes a free curved shape based on an elliptical shape. The first main reflector 26 is designed and disposed in such a manner that a first focal point F1 is positioned in the vicinity of the light emitting portion 22*a* of the first semiconductor light emitting device 22 and a second focal point F2 is positioned in the vicinity of a ridge line 21*c* formed by a curved surface 21*a* and a horizontal surface 21*b* in the base member 21.

Light X emitted from the light emitting portion 22*a* of the first semiconductor light emitting device 22 is reflected over the reflecting surface 27 of the first main reflector 26 and is incident on the projection lens 24 via the vicinity of the second focal point F2. In the subunit 20B (and the subunits 20A, 20C), moreover, there is provided a shade for reflecting a partial light over the horizontal surface 21*b* with the ridge line 21*c* of the base member 21 set to be a boundary line, thereby cutting the light selectively to form an oblique cutoff line on a light distribution pattern projected into the forward part of the vehicle. More specifically, the ridge line 21*c* constitutes a terminator of the subunit 20B (and the subunits 20A, 20C) as an upper edge of the shade.

It is preferable that a part of the light X2 which is reflected over the reflecting surface 27 of the first main reflector 26 and is further reflected by the horizontal surface 21*b* of the base member 21 should be also irradiated forward as an effective light In one or more embodiments, accordingly, a forward side of the vehicle of the horizontal surface 21*b* of the base member 21 takes an optical shape having a reflection angle set properly in consideration of a positional relationship between the projection lens 24 and the first main reflector 26.

The projection lens 24 is a planoconvex aspherical lens formed by an acrylic resin. A rear surface of the projection lens 24, which acts as an incidence plane, is a plane and a forward surface of the projection lens 24, which acts as an emitting plane, is a convex surface. The projection lens 24 is fixed into the vicinity of a tip portion at the forward side of the vehicle in the base member 21 in order to project the light X reflected by the reflecting surface 27 of the first main reflector 26 into the forward part of the vehicle. In one or more embodiments, the projection lens 24 is configured such that the rear focal point thereof becomes coincident with the second focal point F2 of the first main reflector 26.

Accordingly, the light X, which is reflected by the first main reflector 26 and is incident on the projection lens 24, is forward projected as an almost parallel light. More specifically, the subunits 20A, 20B, 20C of the first unit 20 according to one or more embodiments constitute a projector-type lamp unit for forming a collecting cut respectively. The incidence plane 24*a* of the projection lens 24 includes a first vertical diffusing portion 31 for a cutoff line regulation, and the emitting plane 24*b* of the projection lens 24 includes a second vertical diffusing portion 51 for a chromatic aberration regulation.

Next, the second unit 40 will be described. The second unit 40 is configured to form a lower-beam light distribution pattern together with the first unit 20, and is disposed below the subunit 20C. More specifically, the second unit 40 configured to form a large diffusing region forming pattern Pd which is extended more laterally than the diffusing region forming pattern Pc which is formed by the subunit 20C of the first unit 20 (see FIG. 8).

As shown in FIGS. 2 and 3, the second unit 40 includes a second semiconductor light emitting device 42 and a second main reflector 46. The second semiconductor light emitting device 42, which acts as a second light source, is fixed and disposed on the second supporting surface 15*b* of the support member 15. The second main reflector 46 forward reflects light from the second semiconductor light emitting device 42.

In a similar manner as the first semiconductor light emitting device 22, the second semiconductor light emitting device 42 is a white diode having a light emitting portion 42*a* and is mounted on the second supporting surface 15*b* of the support member 15 in a state in which an irradiating axis L2 thereof is turned almost vertically and downward so as to be almost perpendicular to a direction of irradiation of the second unit 40 (a leftward direction in FIG. 3).

The second main reflector 46 is a reflecting member having an inside provided with a reflecting surface 46*a* using, as a reference plane, a parabolic cylindrical surface which sets, as a focal point, an axis passing through the light emitting portion 42*a*. A light Y emitted from the light emitting portion 42*a* of the second semiconductor light emitting device 42 is reflected over the reflecting surface 46*a* of the second main reflector 46 and is irradiated on the forward part of the vehicle. More specifically, the second unit 40 according to one or more embodiments is a reflector-type lamp unit.

The third unit 60 forms an upper-beam light distribution pattern, and includes a third semiconductor light emitting device (not shown) to be a third light source fixed and disposed on the support member 15 and a projection lens 64.

The projection lens 64 is a convex lens type aspherical lens for projecting a light emitted from a light emitting portion of the third semiconductor light emitting device onto a forward part of the vehicle. The projection lens 64 is structured such that a rear focal point of the projection lens 64 is almost coincident with the light emitting portion of the third semiconductor light emitting device (see FIG. 1). Accordingly, the light emitted from the light emitting portion of the third semiconductor light emitting device is directly incident on the projection lens 64 and the incident light is projected forward as an almost parallel light along the optical axis. More specifically, the third unit 60 according to one or more embodiments constitutes a projector-type lamp unit of a direct projection type.

Figure 6:
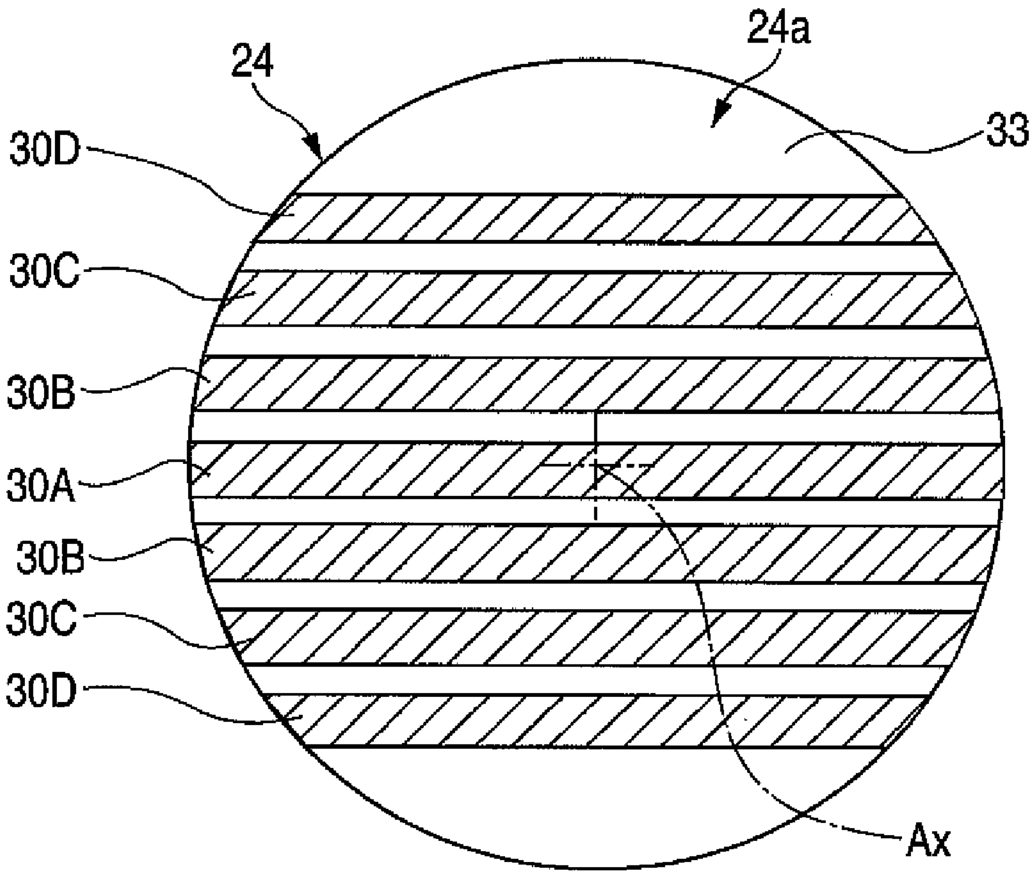
FIG. 6 is a back view showing the projection lens.

In one or more embodiments, as shown in FIGS. 4 and 6, the first vertical diffusing portion 31 which serves to diffuse a light emitted from the projection lens 24 in a vertical direction is provided on the incidence plane 24*a* of the projection lens 24 in the subunit 20B of the first unit 20.

The first vertical diffusing portion 31 includes a plurality of first lens elements 30A, 30B, 30C, 30D, which have a vertical section of a convex shape with respect to a reference surface 33 of the incidence plane 24*a* (a rear surface of the projection lens 24) and are extended in almost parallel with a horizontal portion in the ridge line 21*c* of the base member 21.

More specifically, the first vertical diffusing portion 31 includes a plurality of first lens elements which are parallel to each other at a certain interval in the vertical direction respectively. The first lens elements 30B, 30C, 30D make pairs that are vertically symmetrical with the central first lens element 30A passing through the optical axis Ax interposed therebetween.

The respective first lens elements 30A, 30B, 30C, 30D have vertical sectional shapes set to be circular arcs, and respective light diffusing angles in the vertical direction are set to have equal values in the horizontal direction.

When a width is represented by p, a height is represented by d and a radius of the vertical sectional shape is represented by r, the first lens elements 30A, 30B, 30C, 30D are formed to satisfy $p=2r\sin 15°$ and $d=r(1-\cos 15°)$ and to take different vertical sectional shapes from each other. The width p and the radius r of each of the first lens elements 30A, 30B, 30C, 30D are sequentially decreased apart from the central first lens element 30A in the vertical direction, and the height d of each of the first lens elements 30A, 30B, 30C, 30D is sequentially increased apart from the central first lens element 30A in the vertical direction.

On the other hand, as shown in FIG. 5, the second vertical diffusing portion 51, which serves to diffuse the light emitted from the projection lens 24 in the vertical direction, is provided in upper and lower regions (not shown) disposed apart from the optical axis Ax in the vertical direction in the emitting plane 24*b* of the projection lens 24.

The second vertical diffusing portion 51 includes a plurality of second lens elements 50A, 50B, 50C, 50D having a vertical section taking a concavo-convex shape with respect to a reference surface 55 of the emitting plane 24*b* (a forward surface of the projection lens 24) and extended in an almost horizontal direction.

More specifically, the second vertical diffusing portion 51 includes the second lens elements 50A, 50B, 50C, 50D formed discretely at a certain interval from each other in the vertical direction. The second lens elements 50A, 50B, 50C, 50D have vertical sections set to take wavy shapes, and respective light diffusing angles in the vertical direction are set to have equal values to each other. Any of the second lens elements 50A, 50B, 50C, 50D positioned more distantly from the optical axis Ax in the vertical direction in each of the upper and lower regions have the light diffusing angle in the vertical direction set to have a greater value.

The light diffusing angle in the vertical direction of each of the second lens elements 50A, 50B, 50C, 50D is set by regulating curvatures of concave and convex portions constituting the wavy vertical sectional shapes.

FIG. 8 is a perspective view showing a lower-beam light distribution pattern PL for which is formed on a virtual vertical screen disposed 25 m in front of the vehicle lamp 10 through a light irradiated forward from the vehicle lamp 10 according to one or more embodiments.

As shown in FIG. 8, the lower-beam light distribution pattern PL is formed as a synthetic light distribution pattern of the hot zone forming pattern Pb having the horizontal and oblique cutoff lines CL1, CL2 at an upper edge, the cutoff line forming pattern Pa which is larger than the hot zone forming pattern Pb below the cutoff line, the diffusing region forming pattern Pc which overlaps with the hot zone forming pattern Pb and the cutoff line forming pattern Pa below the cutoff line and is extended more laterally than the cutoff line forming pattern Pa, and the large diffusing region forming pattern Pd which is extended more laterally than the diffusing region forming pattern Pc.

Referring to the cutoff lines CL1, CL2 in the cutoff line forming pattern Pa, the opposing lane side cutoff line CL1 on a right side from the line V-V to be a vertical line passing through a vanishing point H-V in a direction of a front of the lighting device is formed to be extended horizontally and the self-lane side cutoff line CL2 on a left side of the line V-V is a so-called Z type cutoff line which is formed to be raised obliquely to an almost upper part of the line H-H to be a horizontal line passing through the point H-V at a certain angle (e.g., about 15 degrees) from the opposing-lane side cutoff line CL1 and to be then extended horizontally.

In the cutoff line forming pattern Pa, a position of an elbow point E, which is an intersection point of the opposing lane side cutoff line CL1 and the line V-V, is about 0.5 degrees to about 0.6 degrees below the point H-V. The reason is that the optical axis Ax of the vehicle lamp 10 extends in a downward direction, which is about 0.5 degrees to about 0.6 degrees with respect to an axis extending in a front-and-rear direction of the vehicle.

Figure 9:
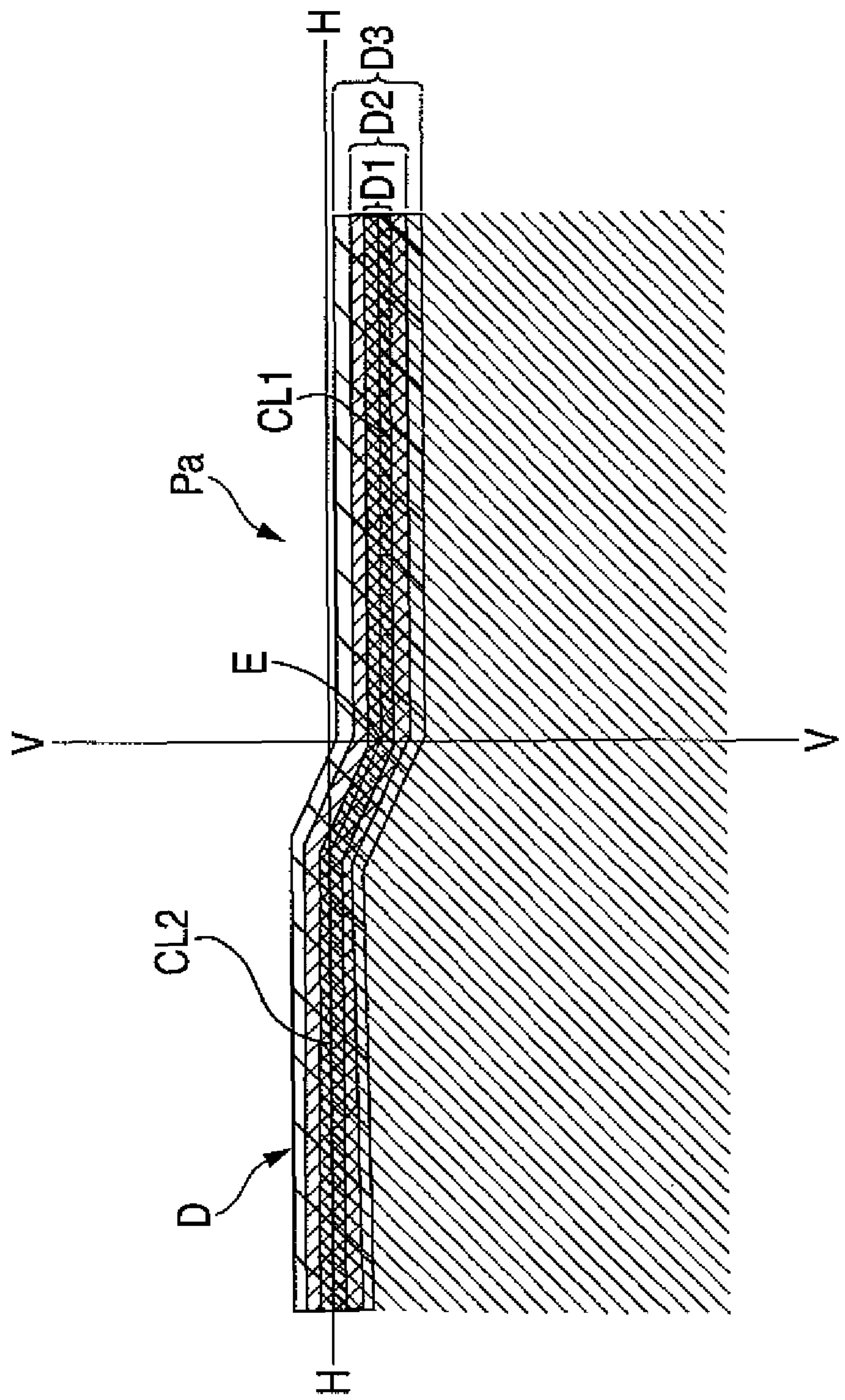
FIG. 9 is an enlarged view around an elbow point of the light distribution pattern illustrated in FIG. 8.

FIG. 9 is a view showing an enlarged region in the vicinity of the elbow point E in the cutoff line forming pattern Pa.

As shown in FIG. 9, the cutoff line forming pattern Pa has the cutoff lines CL1, CL2, which are properly shaded.

More specifically, a diffusing portion D extended like a band in vertical widths D1, D2, D3 which are different from each other is formed with the cutoff lines CL1, CL2 interposed therebetween in the vicinity of the cutoff lines CL1, CL2 in the cutoff line forming pattern Pa. In that case, the diffusing portion D is formed in such a manner that a diffused light is gradually expanded in order of the vertical widths D1, D2, D3 to increase a shading amount.

The diffusing portion D is formed by the diffused lights having the different vertical widths D1, D2, D3 from each other for the following reason. More specifically, the vertical sections of the first lens elements 30A, 30B, 30C, 30D of the first vertical diffusing portion 31 which is formed on the incidence plane 24*a* of the projection lens 24 (the width p, the radius r and the height d) are formed to take different shapes from each other.

Moreover, the diffused lights having the vertical widths D1, D2, D3 in the diffusing portion D are formed in certain widths respectively for the following reason. More specifically, the respective first lens elements 30A, 30B, 30C, 30D are extended in almost parallel with the horizontal portion in the ridge line 21*c* of the base member 21. In this case, the respective first lens elements 30A, 30B, 30C, 30D are formed to be extended along a crossline of the rear surface of the projection lens 24 and a plane including a horizontal line which is orthogonal to the optical axis Ax in the vicinity of the rear focal point F2. Therefore, the diffusing portion D is formed in an almost certain width over a total length of the cutoff lines CL1, CL2 in addition to the vicinity of the elbow point E.

Moreover, the diffused lights are formed in the vertical widths D2, D3 in the diffusing portion D which are greater than the vertical width D1 of the diffused light for the following reason. More specifically, in the respective first lens elements 30A, 30B, 30C, 30D formed on the rear surface of the projection lens 24, the radius r forming the convex vertical sectional shape is set to be sequentially reduced apart from the central first lens element 30A in the vertical direction.

Furthermore, a glimmer portion extended like a band in an almost certain width is formed along the cutoff lines CL1, CL2 in the vicinity of the upper parts of the cutoff lines CL1, CL2 in the cutoff line forming pattern Pa (not shown). The glimmer portion is formed to be gradually darkened apart from the cutoff lines CL1, CL2 in an upward direction.

The glimmer portion is formed by a light emitted from the second vertical diffusing portion 51 which is formed on the emitting plane 24*b* of the projection lens 24. The glimmer portion is formed in a vertical width of about 0.5 degrees. The reason is that the curvatures of the concave and convex portions forming the wavy vertical sectional shape of each of the second lens elements 50A, 50B, 50C, 50D of the second vertical diffusing portion 51 are set to have such a value as to diffuse the light emitted from the projection lens 24 at about 0.5 degrees in the vertical direction.

As described above in detail, in the vehicle lamp 10 according to one or more embodiments, the subunit 20B of the first unit 20 is configured as a projector-type lamp unit using the light emitting portion 42*a* of the second semiconductor light emitting device 42 as a light source. The incidence plane 24*a* of the projection lens 24 includes the first vertical diffusing portion 31 which serves to diffuse the light emitted from the projection lens 24 in the vertical direction.

Therefore, the light emitted forward through the first vertical diffusing portion 31 can be diffused in the vertical direction. Consequently, it is possible to make the cutoff lines CL1, CL2 vague.

In the projector-type vehicle lamp unit configured to form the lower-beam light distribution pattern PL having the cutoff lines CL1, CL2, accordingly, it is possible to enhance the visibility of a driver by obscuring the cutoff lines CL1, CL2.

Moreover, the first vertical diffusing portion 31 includes the first lens elements 30A, 30B, 30C, 30D having the vertical sections taking at least a convex shape with respect to the reference surface 33 of the incidence plane 24*a* in the projection lens 24 and extended in almost parallel with the horizontal portion in the ridge line 21*c* of the base member 21. Therefore, it is possible to control the degree of the diffusion in the vertical direction of the light emitted from the projection lens 24 with high precision. Consequently, it is possible to properly shade the cutoff lines CL1, CL2.

Therefore, it is possible to effectively suppress the generation of a situation in which a brightness in a region in the vicinity of the lower parts of the cutoff lines CL1, CL2 is carelessly decreased or a glare is given to a driver in a car running on an opposing-lane through the light diffused toward the upper parts of the cutoff lines CL1, CL2.

In addition, the light diffusion in the first vertical diffusing portion 31 is carried out in an almost vertical direction. Consequently, it is possible to prevent a variation from being generated on an advantage of the shade of the cutoff lines CL1, CL2 depending on the light incident position in the first vertical diffusing portion 31.

Furthermore, the cutoff lines CL1, CL2 are to be shaded accurately and horizontally with respect to the horizontal portion in the ridge line 21*c* of the base member 21. However, the first vertical diffusing portion 31 is provided on the incidence plane 24*a* of the projection lens 24. Therefore, a regulation of a light which has not entered the lens through the incidence plane 24*a* is simpler than a regulation of a light entering the lens through the emitting plane 24*b* of the projection lens 24 and turned once, and the first lens elements 30A, 30B, 30C, 30D can easily be formed and regulated finely.

Figure 7:
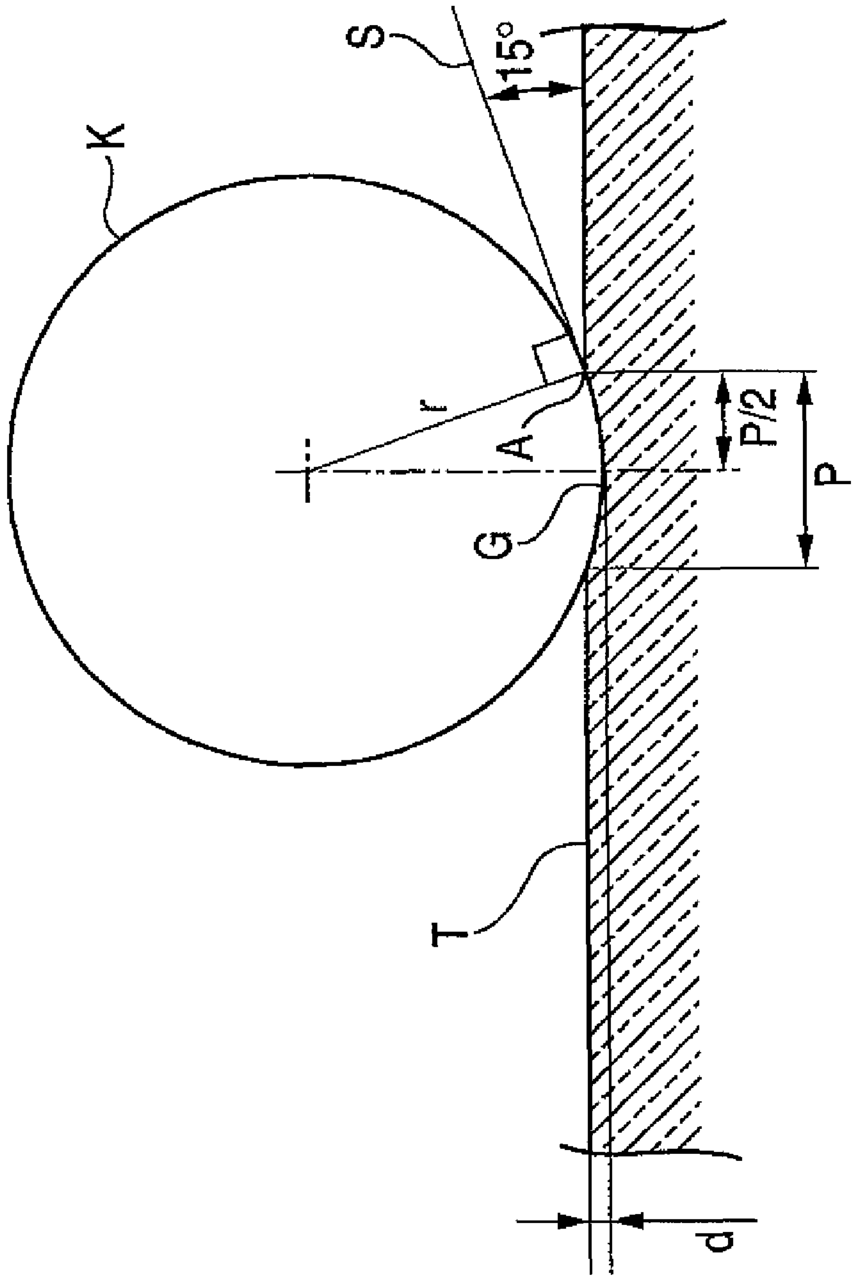
FIG. 7 is an explanatory view showing conditions for forming a groove on a surface of a metal mold which is used to mold a rear surface of the projection lens.

More specifically, when the projection lens 24 formed by an acrylic resin is to be formed integrally, for example, a groove G corresponding to the first lens elements 30A, 30B, 30C, 30D is formed on a metal mold surface T forming the rear surface of the projection lens 24 as shown in FIG. 7. If a radius of a cutting edge circle of a cutter K is set to be r, a groove depth is set to be d, a groove width is set to be p, and furthermore, an angle formed by a tangential line s of the cutting edge circle on an intersection point A with the metal mold surface T with respect to the metal mold surface T is set to be about 15 degrees, and the sectional radius r of the groove G, the groove depth d and the groove width p are regulated to satisfy $p=2r\sin 15°$ and $d=r(1-\cos 15°)$, it is possible to form various shift amounts (vertical widths) D1, D2, D3 in the vertical direction of the cutoff line which are generated on the first lens elements 30A, 30B, 30C, 30D. It is also possible to set the angle formed with the metal mold surface T to have a value other than 15°, thereby generating various shift amounts in the vertical direction of the cutoff line.

By providing the first vertical diffusing portion 31 including the first lens elements 30A, 30B, 30C, 30D, each having different vertical sectional shapes, it is possible to generate various shift amounts in the vertical direction of the cutoff line. Consequently, it is possible to prevent a two-stage cutoff, which might be generated in the case in which a plurality of first lens elements having an identical shape are provided.

Furthermore, the second vertical diffusing portion 51 which serves to diffuse the light emitted from the projection lens 24 in the vertical direction is provided on the upper and lower regions in the emitting plane 24*b* of the projection lens 24.

Therefore, the light emitted forward from the second vertical diffusing portion 51 can be diffused in the vertical direction. Consequently, a spectral color appearing due to a spectral phenomenon generated in a transmission of the light emitted from the second semiconductor light emitting device 42 and reflected by the reflector 26 through the projection lens 24 can be made unremarkable in the vicinity of the upper parts of the cutoff lines CL1, CL2.

Moreover, a vertical diffusing portion for an OHS (overhead sign) which serves to diffuse the light emitted from the projection lens 24 greatly in the vertical direction to the vicinity of the OHS may be formed on the upper and lower end regions in the incidence plane 24*a* of the projection lens 24.

The vertical diffusing portion for the OHS may include a plurality of lens elements extending almost horizontally in a vertical section taking a circular shape which is formed like a convex with respect to the reference surface 33 of the incidence plane 24*a*. Furthermore, the vertical diffusing portion for the OHS is formed by a plurality of lens elements which are finer than the first lens elements 30A, 30B, 30C, 30D of the first vertical diffusing portion 31, and are formed in parallel with each other at a small interval and take the same shapes.

More specifically, the vertical diffusing portion for the OHS can diffuse the light emitted from the projection lens 24 vertically and greatly to the vicinity of the OHS. By providing the lens elements having the same shapes, furthermore, it is possible to illuminate a certain range comparatively clearly and to irradiate a light on the OHS.

It is apparent that the configurations of the projection lens, the light source, the reflector, the shade, the vertical diffusing portion for a cutoff line regulation and the vertical diffusing portion for a chromatic aberration regulation are not restricted to the those of the above exemplary embodiments, and that other various configurations may be employed.

While the first vertical diffusing portion for a cutoff line regulation include the first lens elements formed to take the convex vertical sectional shapes in the exemplary embodiment, for example, the vertical diffusing portion for a cutoff line regulation may also include first lens elements having concave vertical sectional shapes or the convex first lens element and the concave first lens element may also be formed in combination.

Although the description has been given to the case in which the vehicle lamp 10 according to one or more embodiments forms the lower-beam light distribution pattern PL which has a so-called Z-shaped cutoff line, moreover, it is apparent that the present invention can also be applied to a vehicle lamp unit which forms a lower-beam light distribution pattern having an oblique cutoff line.

In the vehicle lamp 10 according to one or more embodiments, furthermore, the first light source of the first unit 20 and the second light source of the second unit 40 are constituted by the first semiconductor light emitting device 22 and the second semiconductor light emitting device 42, respectively.

By using, as the light source of the vehicle lamp 10, the semiconductor light emitting devices 22, 42 such as light emitting diodes (LEDs) which generally have small sizes and low power consumption, therefore, it is possible to effectively utilize a limited power.

As a matter of course, it is apparent that a discharge bulb such as a metal halide bulb or a halogen bulb using a discharge light emitting portion as a light source can also be used for the first light source, the second light source and the third light source in the vehicle lamp according to embodiments of the invention.

While description has been made in connection with exemplary embodiments of the present invention, those skilled in the art will understand that various changes and modification may be made therein without departing from the present invention. For example, numerical values in the above description of the exemplary embodiments may, of course, be set to different values as is advantageous. It is aimed, therefore, to cover in the appended claims all such changes and modifications filling within the true spirit and scope of the present invention.

What is claimed is:

1. A projector-type lamp unit for a vehicle, the projector-type lamp unit comprising:
- a projection lens disposed on an optical axis extending in a front-and-rear direction of the vehicle;
- a light source disposed on a rear side of a rear focal point of the projection lens;
- a reflector configured to forwardly reflect light emitted from the light source toward the optical axis; and
- a shade configured to shield a part of the light reflected by the reflector,
- wherein the projector-type lamp unit is configured to form a light distribution pattern having a cutoff line, wherein the cutoff line is an inverted projection image of an upper edge of the shade,
- wherein an incidence plane of the projection lens comprises a first vertical diffusing portion which regulates the cutoff line,
- wherein the first vertical diffusing portion comprises a plurality of first lens elements extending substantially parallel to a horizontal portion of the upper edge of the shade, and
- wherein a vertical section of each of the first lens elements is a convex or concave with respect to a reference surface of the incidence plane.

2. The projector-type lamp unit according to claim 1,
- wherein an emitting plane of the projection lens comprises a second vertical diffusing portion which regulates a chromatic aberration,
- wherein the second vertical diffusing portion comprises a plurality of second lens elements extending substantially in a horizontal direction, and
- wherein a vertical section of each of the second lens elements is convex and concave with respect to a reference surface of the emitting plane.

3. The projector-type lamp unit according to claim 1, wherein the vertical sections of the first lens elements are different from each other.

4. The projector-type lamp unit according to claim 2, wherein the vertical sections of the first lens elements are different from each other.

5. The projector-type lamp unit according to claim 1, wherein the shade is disposed such that the rear focal point of the projector lens is on the upper edge of the shade.

6. The projector-type lamp unit according to claim 1, wherein the light source is a semiconductor light emitting device.

7. The projector-type lamp unit according to claim 1, wherein the projection lens is made of an acrylic resin.

8. A method of manufacturing a projector-type lamp unit for a vehicle, the method comprising:
- disposing a projection lens on an optical axis extending in a front-and-rear direction of the vehicle;
- disposing a light source on a rear side of a rear focal point of the projection lens;
- configuring a reflector to forwardly reflect light emitted from the light source toward the optical axis; and
- configuring a shade to shield a part of the light reflected by the reflector,
- configuring the projector-type lamp unit to form a light distribution pattern having a cutoff line, wherein the cutoff line is an inverted projection image of an upper edge of the shade,
- disposing a first vertical diffusing portion on an incidence plane of the projection lens,
- wherein the first vertical diffusing portion regulates the cutoff line and comprises a plurality of first lens elements extending substantially parallel to a horizontal portion of the upper edge of the shade, and
- wherein a vertical section of each of the first lens elements is convex or concave with respect to a reference surface of the incidence plane.

9. The method according to claim 8, further comprising disposing a second vertical diffusing portion on an emitting plane of the projection lens, wherein the second vertical diffusing portion regulates a chromatic aberration and comprises a plurality of second lens elements extending substantially in a horizontal direction, and wherein a vertical section of each of the second lens elements is convex and concave with respect to a reference surface of the emitting plane.

10. The method according to claim 8, wherein the vertical sections of the first lens elements are different from each other.

11. The method according to claim 9, wherein the vertical sections of the first lens elements are different from each other.

12. The method according to claim 8, wherein the shade is disposed such that the rear focal point of the projector lens is on the upper edge of the shade.

13. The method according to claim 8, wherein the light source is a semiconductor light emitting device.

14. The method according to claim 8, further comprising forming the projection lens of an acrylic resin.

15. The method according to claim 14, further comprising forming the first vertical diffusing portion integrally with the projection lens by molding the acrylic resin in a groove formed on a metal mold surface.

16. The projector-type lamp unit according to claim 1, wherein each of the first lens elements in the vertical section has a height d measured from the reference surface of the incidence plane and a width p, that has a relationship defined by:

$$p=2d(\sin\theta/1-\cos\theta),$$

wherein θ is an acute angle.

17. The method according to claim 8, wherein each of the first lens elements in the vertical section has a height d measured from the reference surface of the incidence plane and a width p, that has a relationship defined by:

$$p=2d(\sin\theta/1-\cos\theta),$$

wherein θ is an acute angle.

18. The projector-type lamp unit according to claim 1, wherein the first vertical diffusing portion is configured to diffuse the light upwardly and downwardly with respect to the optical axis.

19. The method according to claim 8, further comprising configuring the first vertical diffusing portion to diffuse the light upwardly and downwardly with respect to the optical axis.

* * * * *